United States Patent
Borairi

(10) Patent No.: US 9,672,945 B2
(45) Date of Patent: Jun. 6, 2017

(54) REACTOR SHUTDOWN TRIP ALGORITHM

(71) Applicant: Atomic Energy of Canada Limited, Chalk River (CA)

(72) Inventor: Majid Borairi, Markham (CA)

(73) Assignee: Atomic Energy of Canada Limited, Ontario (CA)

( * ) Notice: Subject to any disclaimer, the term of this patent is extended or adjusted under 35 U.S.C. 154(b) by 313 days.

(21) Appl. No.: 13/804,723

(22) Filed: Mar. 14, 2013

(65) Prior Publication Data

US 2013/0294561 A1 Nov. 7, 2013

Related U.S. Application Data

(62) Division of application No. 13/823,270, filed as application No. PCT/IB2011/002146 on Sep. 15, 2011.

(60) Provisional application No. 61/384,130, filed on Sep. 17, 2010.

(51) Int. Cl.
  *G21C 7/36* (2006.01)
  *G21D 3/04* (2006.01)
  *G21D 3/00* (2006.01)

(52) U.S. Cl.
  CPC .............. *G21C 7/36* (2013.01); *G21D 3/001* (2013.01); *G21D 3/04* (2013.01); *Y02E 30/39* (2013.01)

(58) Field of Classification Search
  CPC .................................. G21C 7/36; G21D 3/001
  USPC .................................................. 376/215, 219
  See application file for complete search history.

(56) References Cited

U.S. PATENT DOCUMENTS

| | | | |
|---|---|---|---|
| 3,660,228 A | | 5/1972 | Magladry |
| 3,936,885 A | | 2/1976 | Mutafelija |
| 4,182,652 A | | 1/1980 | Puechl |
| 4,273,613 A | | 6/1981 | Radkowsky |
| 4,399,095 A | | 8/1983 | Morris |
| 4,716,009 A | * | 12/1987 | Thaulez ........................ 376/242 |
| 4,783,307 A | | 11/1988 | Galligan et al. |
| 5,406,598 A | | 4/1995 | Takeuchi et al. |
| 5,555,279 A | | 9/1996 | Nir et al. |
| 6,061,412 A | | 5/2000 | Stucker et al. |

(Continued)

FOREIGN PATENT DOCUMENTS

| | | |
|---|---|---|
| CA | 1094698 | 1/1981 |
| EP | 2617039 | 7/2013 |

(Continued)

OTHER PUBLICATIONS

IP3 FSAR Update. Dec. 3, 2007. Exhibit FP No. 12, Indian Point Unit 3. Accession No. ML081960748. available online: <https://adamswebsearch2.nrc.gov/webSearch2/main.jsp?AccessionNumber=ML081960748>.*

(Continued)

*Primary Examiner* — Jack W Keith
*Assistant Examiner* — Lily C Garner
(74) *Attorney, Agent, or Firm* — Michael Best & Friedrich LLP

(57) ABSTRACT

A controller for producing a nuclear reactor shutdown system trip signal in response to at least one detector signal. The controller includes a signal conditioning module receiving the at least one detector signal and outputting a measured flux signal. A rate module generates a rate signal from the measured flux signal. A comparator circuit compares the rate signal to a trip setpoint and generates a first trip signal.

17 Claims, 6 Drawing Sheets

(56) References Cited

U.S. PATENT DOCUMENTS

| | | | |
|---|---|---|---|
| 6,430,247 | B1 | 8/2002 | Mourlevat et al. |
| 8,445,839 | B2* | 5/2013 | Holaday et al. ........... 250/252.1 |
| 2007/0201600 | A1 | 8/2007 | Kudryavtsev |
| 2013/0294561 | A1 | 11/2013 | Borairi |
| 2013/0294562 | A1 | 11/2013 | Borairi |

FOREIGN PATENT DOCUMENTS

| | | |
|---|---|---|
| EP | 2620947 | 7/2013 |
| EP | 2620948 | 7/2013 |
| GB | 887392 | 6/1962 |

OTHER PUBLICATIONS

Yih, Tien Sieh, and Peter Griffith. Unsteady momentum fluxes in two-phase flow and the vibration of nuclear reactor components. Cambridge, Mass.: MIT Dept. of Mechanical Engineering,[1968], 1968. available online: <http://dspace.mit.edu/bitstream/handle/1721.1/61496/HTL_TR_1968_058.pdf?sequence=1>.*

Yih, Tien Sieh, and Peter Griffith. Unsteady momentum fluxes in two-phase flow and the vibration of nuclear reactor components. Cambridge, Mass.: MIT Dept. of Mechanical Engineering,[1968], 1968. MIT Report No. DSR 70318-58. available online: <http://dspace.mit.edu/bitstream/handle/1721.1/61496/HTL_TR_1968_058.pdf?sequence=1>.*

IP3 FSAR Update. Dec. 3, 2007. Exhibit FP No. 12, Indian Point Unit 3. Accession No. ML081960748. full document available online: <https://adamswebsearch2.nrc.gov/webSearch2/main.jsp?AccessionNumber=ML081960748>.*

Koclas. Reactor Control and Simulation, Aug. 1996. Ecole Polytechnique de Montreal Institute de Genie Nucleaire. Montreal, Canada. Chulalongkorn Univ. ch. 4 available online: <https://canteach.candu.org/Content%20Library/20044305.pdf> and full document available online (scroll to item #31): <http://www.nuceng.ca/canteachvba/aTechnician.htm#1996>.*

EP13001457.4 Extended European Search Report and Written Opinion dated May 9, 2014 (9 pages).

United States Patent Office Action for U.S. Appl. No. 13/804,795, Dated Jul. 15, 2014 (13 pages).

PCT/IP2011/002146 International Search Report dated Mar. 14, 2012 (3 pages).

PCT/IP2011/002146 International Preliminary Report on Patentability and Written Opinion of the International Searching Authority dated Mar. 14, 2012 (5 pages).

Office Action from the US Patent and Trademark Office for U.S. Appl. No. 13/823,270, dated Jul. 30, 2014 (15 pages).

EP13001456.6 European Office Action dated Sep. 25, 2014 (5 pages).

Office Action from the US Patent and Trademark Office for U.S. Appl. No. 13/804,795, Dated Feb. 13, 2015 (32 pages).

Office Action from the US Patent and Trademark Office for U.S. Appl. No. 13/823,270, Dated Feb. 3, 2015 (28 pages).

"Yih et al., ""Griffith. Unsteady momentum fluxes in two-phase flow and the vibration of nuclear reactor components"" (1968) MIT Report, Department of Mechanical Engineering, Cambridge, available online:<http://dspace.mit.edu/bitstream/handle/1721.1/61496/HTL_TR_1968_058.pdf?sequence=1>".

Kim et al., "Design features of HANARO Neutron Flux Monitoring System and its operating experiences" (1999), abstract.

IP3 FSAR, "Exhibit FP No. 12, Indian Point Unit 3. Accession Number: ML081960748" (Update Dec. 3, 2007) available online: <https://adamswebsearch2.nrc.gov/webSearch2/main.jsp?AccessionNumber=ML081960748>.

Burns, "Introduction to Nuclear Reactor Operations, Chapter 9 Reactor Core Analysis" (1988) Detroit Edison Company, University of Michigan, available online: <ftp://ftp.ecn.purdue.edu/jere/BURN/Ch-09.pdf>.

"Moore, Jr., ""Instrumentation for nuclear power plant control"" (1970) available online:<http://www.iaea.org/inis/collection/NCLCollectionStore/_Public/01/000/1000100.pdf>".

Koclas, "Reactor Control and Simulation" (Aug. 1996) Ecole Polytechnique de Montreal Institute de Genie Nucleaire, Montreal, available online, item No. 31: <http://www.nuceng.ca/canteachvba/aTechnician.htm#1996>.

PCT/IP20111002146 International Search Report dated Mar. 14, 2012 (3 pp.).

PCT/IP20111002146 International Preliminary Report on Patentability and Written Opinion of the International Searching Authority dated Mar. 14, 2012 (5 pp.).

EP13001456.6 Extended European Search Report and Written Opinion dated Sep. 16, 2013 (7 pages).

"Ex-Core Neutron Flux Monitoring System," Technical Instruction Manual, (appear to be created Apr. 1, 1983), 17 pages, Combustion Engineering, Inc., Windsor.

"Neutron Measurement System," Operation & Maintenance Manual, (appear to be created in 2000), 18 pages, 021-0072 Rev. 01, IST, Canada.

CA 2811485, Third Party Submission, Feb. 5, 2014, 11 pages.
EP 11826542.9, Third Party Submission, Feb. 18, 2014, 4 pages.
EP 13001457.4, Third Party Submission, Feb. 18, 2014, 5 pages.
EP 13001456.6, Third Party Submission, Feb. 19, 2014, 5 pages.
English Translation of Office Action for Ukraine Application No. a201304865 first known to us Feb. 2, 2016 (4 pages).

Notice of Allowance from the Intellectual Property Office of the People's Republic of China for Application 201180044891.5 dated Feb. 2, 2016 (2 pages).

Notification of the First Office Action from the Intellectual Property Office of the People's Republic of China for Application No. 201180044891.5 dated Mar. 23, 2015 (15 pages).

Extended European Search Report for Application No. 11824652.9 dated Feb. 26, 2016 (8 pages).

International Astomic Energy Agency, "Thorium fuel utilization: Options and trends" Proceedings of three IAEA meetings held in Vienna in 1997, 1998 and 1999, printed 2002 (1-376).

Office Action Summary from the Korean Patent and Trademark Office for Application No. 10-2013-7008564 dated Jun. 1, 2016 (4 pages).

Bozar et al., "Thorium fuel-cycle studies for CANDU reactor," in Thorium fuel utilization-Options and trends, IAEA-TECDOC-1319, (2002).

Office Action from the United States Patent and Trademark Office for U.S. Appl. No. 13/885,592, dated Jul. 11, 2016.

Canadian Office Action for Application No. 2,811,485 dated Nov. 1, 2016 (3 pages).

European Office Action for Application No. 11 824 652.9 dated Nov. 16, 2016 (4 pages).

Korean Office Action for Application No. 10-2013-7008939 dated Dec. 30, 2016 (11 pages).

English translation of the Notice to Submit a Response from the Korean Intellectual Property Office for Application No. 10-2013-7008939 dated Dec. 30, 2016.

Office Action from the Canadian Intellectual Property Office for Application No. 2,811,485 dated Oct. 1, 2015 (3 pages).

Office Action from the United States Patent and Trademark Office for U.S. Appl. No. 13/823,270, dated Jun. 3, 2016 (20 pages).

Office Action from the United States Patent and Trademark Office for U.S. Appl. No. 13/804,795, dated Jun. 7, 2016 (29 pages).

* cited by examiner

REACTOR SHUTDOWN TRIP ALGORITHM

RELATED APPLICATIONS

This Application claims priority to U.S. Provisional Patent Application No. 61/384,130, filed Sep. 17, 2010, the entire contents of which are incorporated herein by reference.

BACKGROUND

The present invention relates to nuclear reactor safety systems. More particularly, the invention relates to trip signals that are especially effective at high power for reactor safety shutdown systems.

Modern nuclear reactors commonly include one or more automatic safety systems that are designed to quickly and safely shutdown the reactor in the event of a casualty such as a loss of coolant accident (LOCA) or uncontrolled power excursion. These automatic safety systems are tripped when one or more parameters reach corresponding thresholds, or setpoints. The design of trip logics for automatic safety shutdown systems must accommodate two conflicting requirements: the systems must be tripped quickly enough to minimize the extent of the casualty, while being immune to spurious trips during conditions that do not require reactor shutdown.

SUMMARY

In some embodiments, the invention provides a method of controlling a nuclear reactor shutdown system. A parameter related to a fission rate within a core of the reactor is detected with a sensor providing an output signal corresponding to the fission rate. A measured flux signal is determined from the output signal with a signal processing device. The measured flux signal corresponds to a percentage of a power of the reactor. A first derivative of the measured flux signal is calculated with a rate module. The rate module outputs a rate signal related to a percentage of reactor power per unit of time. The rate signal is compared to a rate signal setpoint with a comparator module. The comparator module generates a trip signal if the rate signal is greater than the rate signal setpoint.

In other embodiments, the invention provides a shutdown system for a nuclear reactor having a reactor core. A sensor is associated with the reactor core and operable to detect a parameter related to a fission rate within the core and generate an output signal related to the fission rate. A signal conditioning module is operable to generate a measured flux signal based on the output signal. The measured flux signal corresponds to a percentage of a power of the nuclear reactor. A shutdown system trip controller includes a rate module operable to generate a rate signal from the measured flux signal and a comparator module operable to compare the rate signal to a trip setpoint and generate a trip signal if the rate signal is greater than the trip setpoint. A shutdown apparatus is operable to absorb neutrons within the reactor core upon receipt of the trip signal.

In yet other embodiments, the invention provides a controller for producing a nuclear reactor shutdown system trip signal in response to at least one sensor signal. A signal conditioning module is operable to receive the at least one detector signal and output a measured flux signal. A rate module is operable to generate a rate signal from the measured flux signal. A comparator module is operable to compare the rate signal to a trip setpoint and generate a first trip signal if the rate signal is greater than the trip setpoint.

In still other embodiments, the invention provides a method of controlling a nuclear reactor shutdown system. A parameter related to a fission rate within a core of the reactor is detected with a sensor. The sensor provides an output signal corresponding to the fission rate. A measured flux signal is determined from the output signal with a signal processing device. The measured flux signal corresponds to a percentage of a reactor power. A first derivative of the measured flux signal is calculated with a rate module. The rate module outputs a rate signal related to a percentage of reactor power per unit of time. The rate signal is biased with a bias signal component to produce a biased signal. A gain is applied to the biased signal to produce a rate-based signal component. The rate-based signal component and measured flux signal are summed to produce a rate-assisted flux signal corresponding to a percentage of a reactor power. The rate assisted flux signal is compared to a trip setpoint with a comparator module. The comparator module generates a trip signal if the rate assisted flux signal is greater than the trip setpoint.

In other embodiments, the invention provides a shutdown system for a nuclear reactor having a reactor core. A sensor is associated with the reactor core and operable to detect a parameter related to a fission rate within the core and generate an output signal related to the fission rate. A signal conditioning module is operable to generate a measured flux signal based on the output signal. The measured flux signal corresponds to a percentage of a reactor power of the nuclear reactor. A shutdown system trip controller includes a rate module operable to generate a rate signal from the measured flux signal. A biasing component is operable to generate a biased signal. An amplifier module is operable to apply a gain to the biased signal to produce a rate-based signal component. A summing module is operable to apply the rate-based signal component to the measured flux signal to produce a rate-assisted flux signal. A comparator module is operable to compare the rate-assisted flux signal to a trip setpoint. The comparator module generates a trip signal if the rate-assisted flux signal is greater than the trip setpoint. A shutdown apparatus is operable to absorb neutrons within the reactor core upon receipt of the trip signal.

In yet other embodiments, the invention provides a controller for producing a nuclear reactor shutdown system trip signal in response to a sensor signal. A signal conditioning module receives the sensor signal and outputs a measured flux signal. A rate module is operable to generate a rate signal from the measured flux signal. A biasing component is operable to generate a biased signal. An amplifier module is operable to apply a gain to the biased signal to produce a rate-based signal component. A summing module is operable to apply the rate-based signal component to the measured flux signal to produce a rate-assisted flux signal. A comparator module is operable to compare the rate-assisted flux signal to a trip setpoint and generate a trip signal.

In still other embodiments, the invention provides a method of controlling a nuclear reactor shutdown system. A first parameter related to a fission rate within a core of the reactor is detected with a first sensor. The first sensor provides a first output signal corresponding to the fission rate. A second parameter related to the fission rate within the core of the reactor is detected with a second sensor. The second sensor provides a second output signal corresponding to the fission rate. At least the first output signal and the second output signal are processed into at least a first measured flux signal and a second measured flux with a signal processing device. The first measured flux signal and the second measured flux signal each correspond to a percentage of a reactor power. An average flux signal is calculated from the first measured flux signal and the second measured flux signal with an averaging module. A second derivative of the average flux signal is calculated with a rate module. The rate module outputs an average flux acceleration signal related to a percentage of reactor power per unit of time, per unit of time. The average flux acceleration signal is compared to an acceleration signal setpoint with a comparator module. The comparator module outputs a trip signal if the average flux acceleration signal is greater than the acceleration signal setpoint.

In other embodiments, the invention provides a shutdown system for a nuclear reactor having a reactor core. A first sensor is associated with the reactor core and operable to detect a first parameter related to a fission rate within the core and generate a first output signal related to the fission rate. A second sensor is associated with the reactor core and operable to detect a second parameter related to the fission rate within the core and generate a second output signal related to the fission rate. A signal conditioning module is operable to receive the first output signal and the second output signal and generate a first measured flux signal and a second measured flux signal. The first measured flux signal and the second measured flux signal each corresponding to a percentage of a reactor power of the nuclear reactor. A shutdown system trip controller includes an averaging module operable to receive at least the first measured flux signal and the second measured flux signal and to calculate an average flux signal. A rate module is operable to calculate a second derivative of the average flux signal and to output an average flux acceleration signal related to a percentage of reactor power per unit of time, per unit of time. A comparator module is operable to compare the average flux acceleration signal to a flux acceleration setpoint. The comparator generates a trip signal if the average flux acceleration signal is greater than the flux acceleration setpoint. A shutdown apparatus is operable to absorb neutrons within the reactor core upon receipt of at least the trip signal.

In yet other embodiments, the invention provides a controller for producing a nuclear reactor shutdown system trip signal in response to at least a first sensor output signal and a second sensor output signal. A signal conditioning module receives at least the first sensor output signal and the second sensor output signal and generates a first measured flux signal and a second measured flux signal. The first measured flux signal and the second measured flux signal each corresponding to a percentage of a reactor power of the nuclear reactor. An averaging module is operable to receive at least the first measured flux signal and the second measured flux signal and to calculate an average flux signal. A rate module is operable to calculate a second derivative of the average flux signal and to output an average flux acceleration signal related to a percentage of reactor power per unit of time, per unit of time. A comparator module is operable to compare the average flux acceleration signal to a flux acceleration setpoint. The comparator generates a first trip signal if the average flux acceleration signal is greater than the flux acceleration setpoint.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
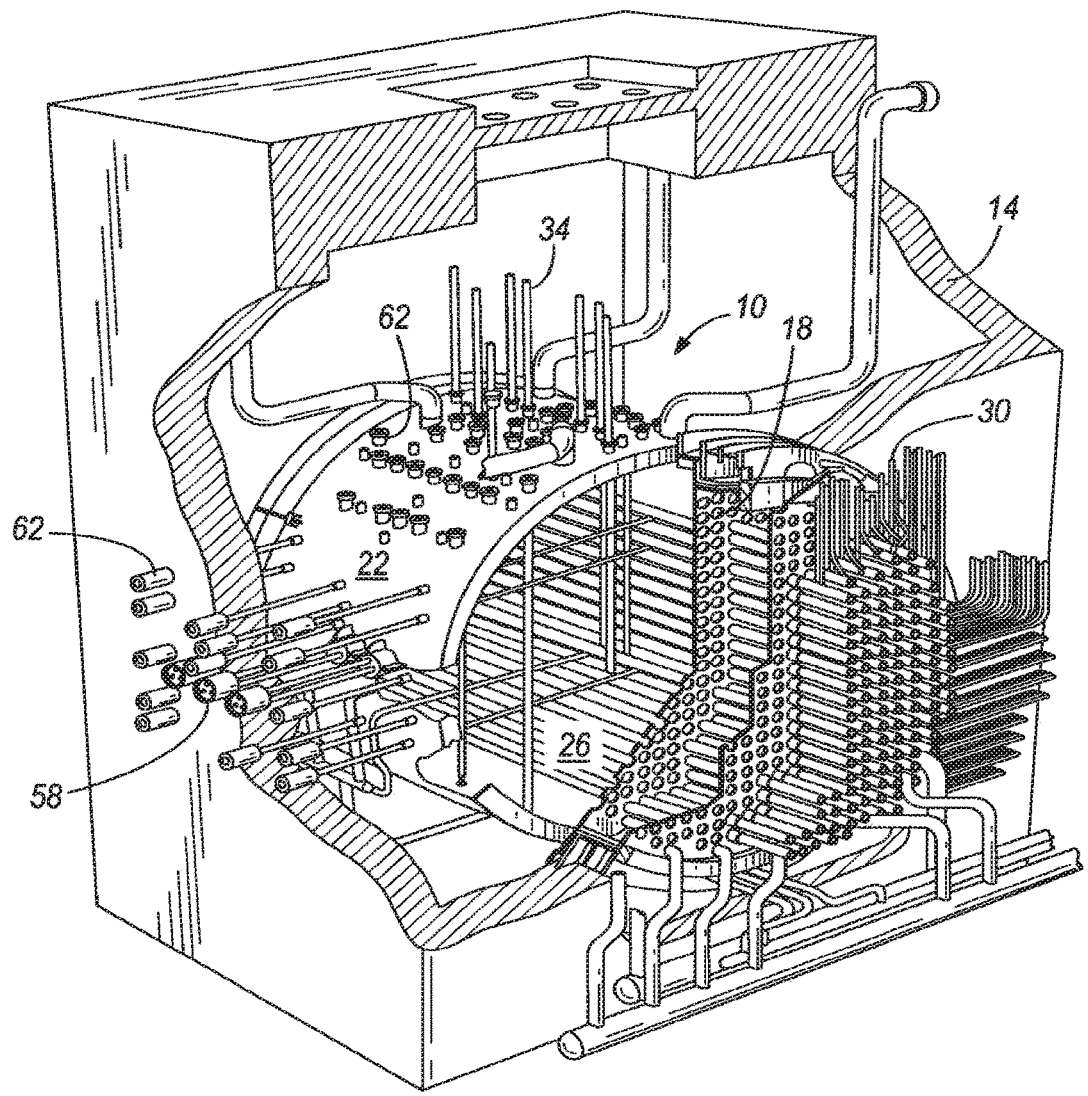
FIG. 1 is a cutaway perspective view of nuclear reactor.

FIG. 1 illustrates a nuclear reactor, such as a pressurized heavy water reactor 10 (e.g., a Canadian Deuterium Uranium (CANDU) type nuclear reactor). The reactor 10 is installed within a reinforced vault 14. The vault 14 is one of several layers of containment vessels that surround the reactor. This nuclear reactor environment and application is presented by way of example only, it being understood that the present invention is applicable for use in other types, sizes, and constructions of nuclear reactors. For example, the invention is also applicable for use in pressurized light water reactors, boiling water reactors, and liquid metal reactors.

In general, nuclear reactors generate energy from a nuclear chain reaction (i.e., nuclear fission) in which a free neutron is absorbed by the nucleus of a fissile atom in a nuclear fuel, such as Uranium-235 ($^{235}U$). When the free neutron is absorbed, the fissile atom splits into lighter atoms and releases more free neutrons to be absorbed by other fissile atoms, resulting in a nuclear chain reaction. Thermal energy released from the nuclear chain reaction is converted into electrical energy through a number of other processes.

The reactor 10 includes a number of fuel channels 18 within which fissile-material loaded fuel bundles (not shown) are positioned. The fuel channels 18 are arranged horizontally within a cylindrical reactor vessel known in a CANDU reactor as a Calandria 22. In a CANDU reactor, the Calandria 22 is filled with a heavy water moderator. The fuel channels 18 within the Calandria 22 form a reactor core 26. Feeder pipes 30 supply sub-cooled heavy-water reactor coolant to each of the fuel channels 18. The feeder pipes 30 and fuel channels 18 form a portion of a primary reactor coolant transport loop that also includes a number of steam generators, reactor coolant pumps, and associated piping.

FIG. 1 also illustrates several aspects of instrumentation, control, and safety systems associated with the reactor 10. Vertically oriented control rods 34 are controllably inserted or withdrawn from the reactor core 26 to vary reactivity by absorption of neutrons within the core 26. The control rods 34 may be manually and automatically controlled to vary reactivity within the reactor core 26 during operation of the reactor.

Figure 2:
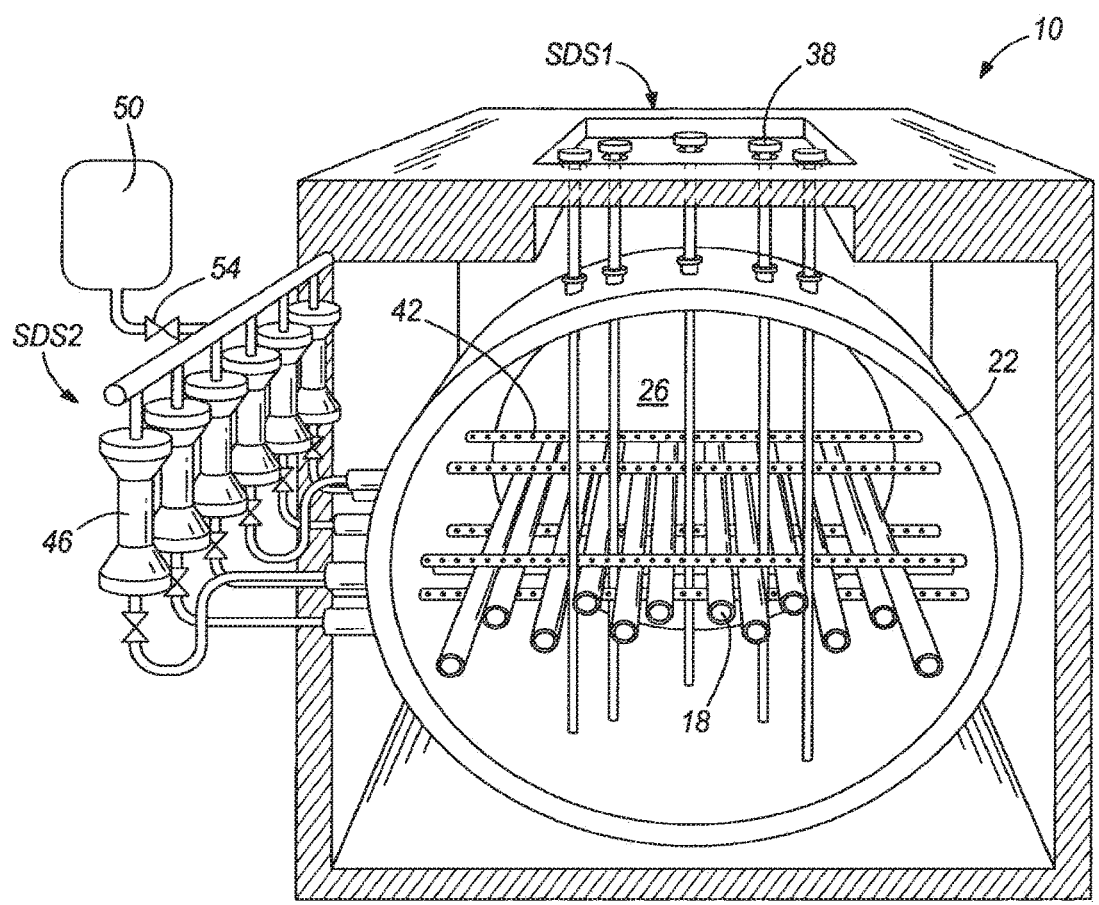
FIG. 2 is a cutaway perspective view of safety shutdown systems (SDS) associated with the nuclear reactor of FIG. 1.

As shown in FIG. 2, two independent reactor safety shutdown systems, SDS1 and SDS2, are provided. Each shutdown system, acting alone, is designed to shut the reactor down and maintain it in a safe shutdown condition. The shutdown systems SDS1 and SDS2 are independent of a reactor control system and are also independent of each other. In general, reactor operation is terminated by the shutdown systems SDS1 or SDS2 when multiple indications of a neutronic or process parameter enter unacceptable ranges (i.e., exceed a setpoint).

The measurement of each parameter that can result in initiation of a safety shutdown is at least triplicated (i.e., at least three detectors per parameter, per shutdown system SDS1 and SDS2). Each safety shutdown system, in turn, includes three separate and independent trip channels (e.g., channels D, E and F for SDS1 and channels G, H and J for SDS2) with a requirement that two of the three trip channels must exceed their respective setpoints before a safety shutdown is initiated. This "two out of three" logic reduces the possibility of spurious trips causing a reactor shutdown. It should also be noted that equipment used on shutdown systems is allocated exclusively to reactor shutdown protection and for no other purposes. In addition, interlocks may be provided such that if a shutdown system SDS1 or SDS2 has been operated, it is not possible to insert any positive reactivity into the reactor core by, for example, withdrawing one or more control rods 34. This further reduces the possibility of the reactor power increasing while the original fault condition still exists.

As shown in FIG. 2, SDS1 includes a plurality (twenty eight, for example) of spring-assisted shutoff rods 38. The shutoff rods drop into the core 26 upon receipt of least two trip signals from channels D, E, or F. The shutoff rods 38 absorb neutrons within the core 26 to quickly lower reactivity and thereby terminate reactor power operation and maintain the reactor 10 in a safe shutdown condition. SDS1 has sufficient speed and negative reactivity to reduce the reactor power to levels consistent with available cooling.

SDS2 provides a second independent method of quickly shutting down the reactor in the event of a serious process excursion by injecting a strong neutron absorbing solution (e.g., gadolinium nitrate) into the moderator. As shown in FIG. 2, six perforated nozzles 42 run horizontally across the Calandria 22. Each nozzle 42 is connected to a poison tank 46 filled with the neutron absorbing solution. A high-pressure helium tank 50 is selectively coupled to the poison tanks 46 via a single automatic isolation valve 54. When any two out of three channels (G, H, or J) produce a trip signal, the automatic isolation valve 54 is opened, pressurizing the poison tanks 50 and thereby injecting the neutron absorber solution into the reactor core 26.

The monitoring and control of a nuclear reactor requires instrumentation for a wide range of neutron flux levels. Flux within a reactor's operating range (full shutdown to rated full power) can be considered as varying from $10^7$ to $10^{14}$ N/(cm$^2$ s)—or seven "decades" of neutron flux. Referring back to FIG. 1, ion chambers 58 and in-core flux detectors (ICFDs) 62 provide for measurement of neutron flux throughout the reactor core and throughout operating range. Ion chambers 58 and ICFDs 62 are utilized by both SDS1 and SDS2, as well as for routine reactor control.

Three ion chambers 58 are located on each side of the Calandria 22. The ion chambers 58 assigned to SDS1 are located on one side of the reactor and those for SDS2 are on the opposite side, to achieve systems separation. There are three ion chambers 58 assigned to each of SDS1 and SDS2, with one ion chamber 58 per trip channel D, E, F, and G, H, J, respectively.

At low reactor power levels, say below 15% full power, indication of bulk neutron flux, as opposed to localized (i.e., regional) neutron flux, is important. Ion chambers, because of their fast response time and high sensitivity are used for low power neutron flux detection. The ion chambers 58 are located outside of the reactor core 10 (hence their reading is often referred to as "out of core") and will generate a signal in the range from $10^{-5}$ to 100 μA over seven decades of neutron flux.

Figure 3:
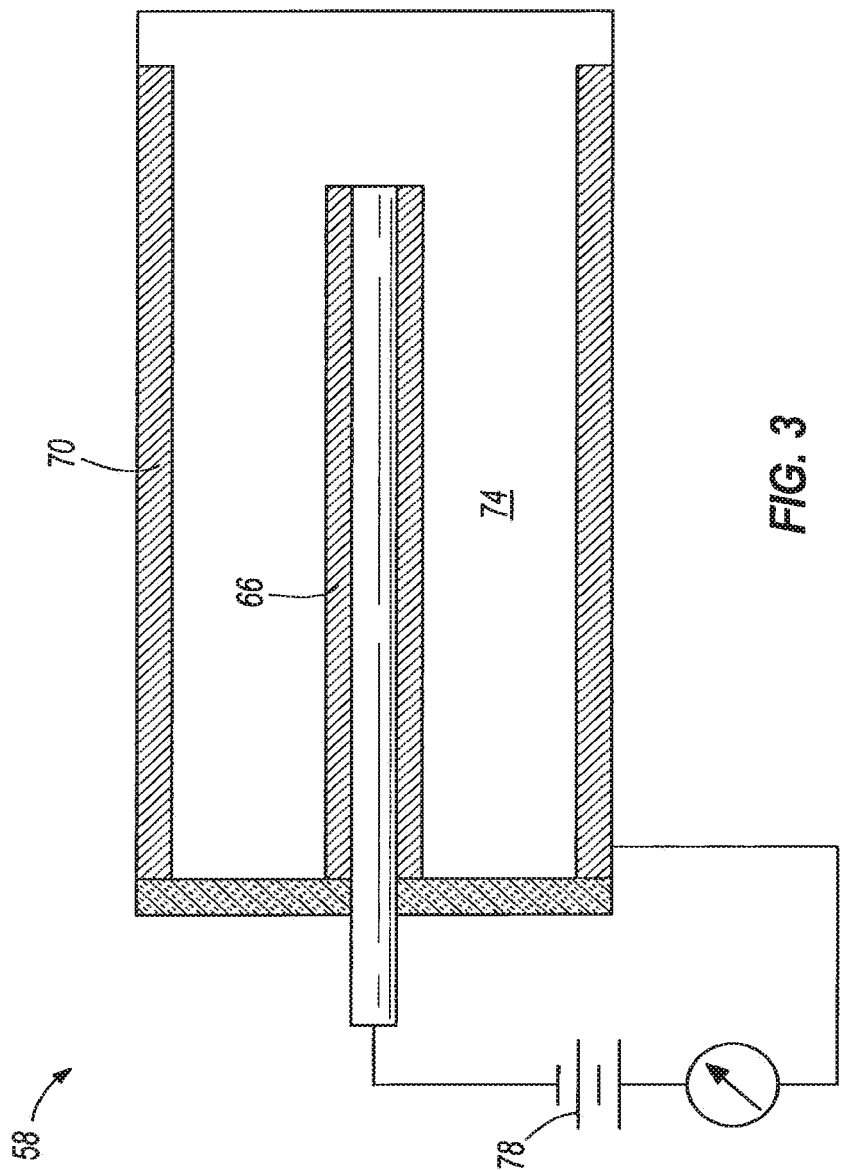
FIG. 3 is a schematic illustration of an ion chamber detector of the nuclear reactor shown in FIG. 1.

FIG. 3 is a schematic illustration of an ion chamber 58. An ion chamber 58 consists of an insulated electrode 66 sealed within a gas tight housing 70. An ionizing gas 74 that is chemically stable under irradiation, such as hydrogen, is used to fill the chamber. The electrode 66 and housing 70 are coated with boron-10 ($^{10}$B) to provide neutron sensitivity. When $^{10}$B absorbs a neutron, an ionizing alpha particle is released. A polarizing voltage supply 78 (approximately 600 Volts) is applied across the electrode 66 to produce a small current signal on the order of a micro-amp as a function of the flux level. As described in greater detail below, the micro-amp output signal is processed and compared with a setpoint to generate a single channel trip signal. Because ion chambers are utilized over such a wide range of neutron flux, output signals from ion chambers are often processed to produce a logarithmic signal. However, signals from ion chambers may also be expressed linearly.

Figure 4:
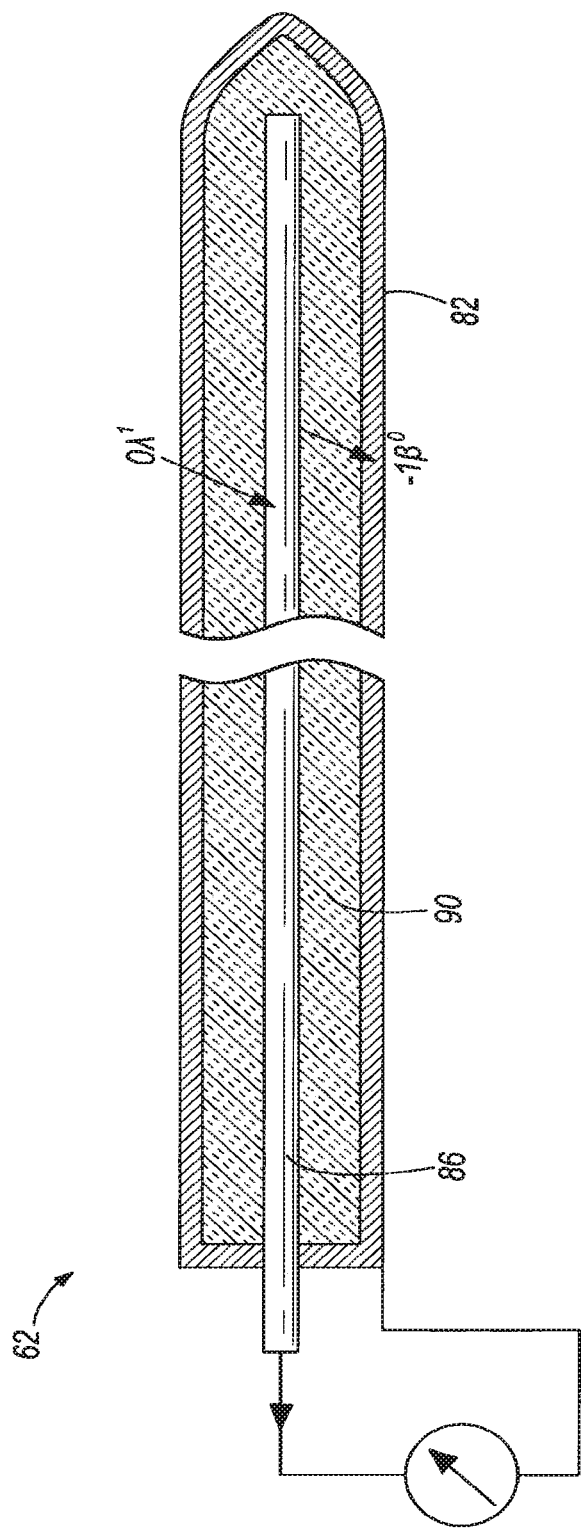
FIG. 4 is a schematic illustration of an in-core flux detector of the nuclear reactor shown in FIG. 1.

Although ion chambers are very accurate neutron detectors, their relatively large size, requirement for polarizing voltage and delicate construction make them impractical to be used to detect flux distribution inside the reactor. For this purpose, simple and relatively inexpensive in-core flux detectors (ICFDs) have been developed. ICFDs are self-powered devices that produce a small current signal on the order of a micro-amp proportional to the fission rate within the reactor. ICFDs are selected for indication over the last decade of neutron flux to provide a linear measurement signal from approximately 5% to 100% of full power. As illustrated in FIG. 4, an ICFD 62 includes an Inconel™ outer sheath 82 and an inner emitter wire 86. Various materials can be used for the emitter wire 86, the most common being vanadium and platinum. The outer sheath 82 and emitter wire 86 are separated by a layer of insulation 90 such as magnesium oxide, MgO.

In the illustrated reactor 10 of FIG. 1, there are fifty-four vertically oriented ICFDs 62 for SDS1, and forty-eight horizontally oriented ICFDs 62 for SDS2. The ICFDs 62 are distributed among the various shutdown system logic channels: channels D, E and F (SDS1) contain eighteen detectors each, channels G, H, and J (SDS2) contain sixteen detectors each.

As mentioned previously, when a neutron flux is received by a flux detector such as an ion chamber or ICFD, the resulting output signal is a small current signal on the order of a micro-amp at full reactor power. Before the output signals can be utilized as inputs by either SDS1 or SDS2, the signals must be converted. The output signal of an ICFD is initially converted to a voltage, amplified and then processed with analog circuitry called a Dynamic Signal Compensator (DSC), to match the heat flux. This DSC corrects the difference between the transient response of the ICFD and the corresponding change in the power (heat) generation in the fuel. The resulting voltage signal represents a percentage of a full power (% FP).

Figure 5:
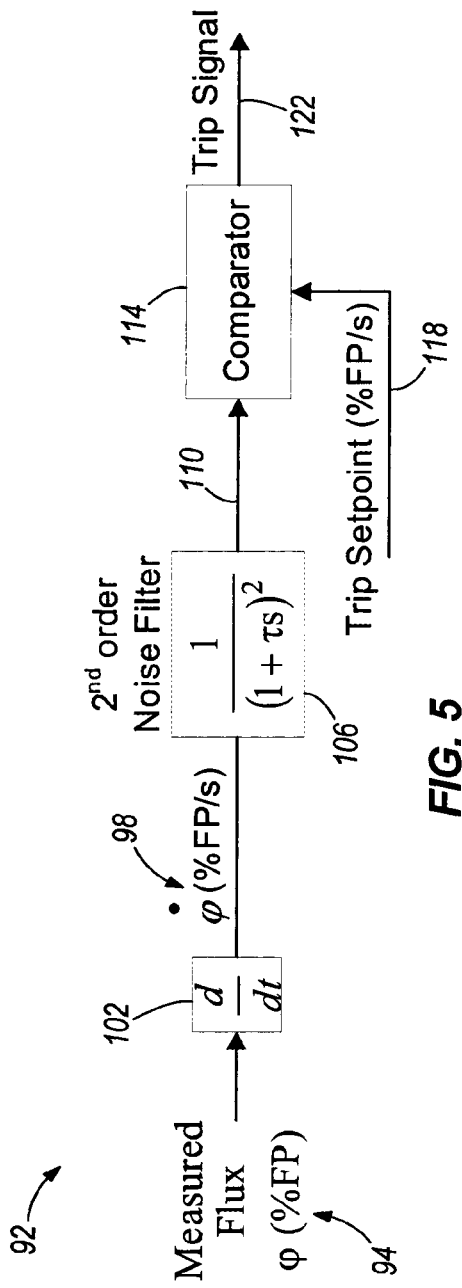
FIG. 5 is a block diagram of an algorithm for a neutron flux rate-based SDS trip signal.

FIG. 5 is a block diagram of a flux-rate trip algorithm 92 for a safety shutdown system such as SDS1 or SDS2. A signal 94 representing % FP is received by the algorithm 92. A rate signal 98, expressed in % FP per unit of time, and based on a first derivative of the signal 94, is generated by a rate module 102. The rate module 102 may be a portion of a micro-processor or may include, for example, a differentiator circuit.

The rate signal 98 is then passed through a noise filter module 106. In the illustrated example, the noise filter module 106 is a $2^{nd}$ order low pass filter, where τ is a filter time constant. The filter time constant τ is an independent design parameter determined by analysis of experimental and operational data. A large value of τ reduces peak noise, but also results in a slower trip for a given trip setpoint. Determining the filter constant τ and trip setpoints is a balance between spurious trip immunity and response time.

After passing through the noise filter module 106, a filtered rate signal 110 enters a comparator module 114. Within the comparator module 114, the filtered rate signal 110 is compared to a preset trip setpoint 118. If the filtered rate signal 110 is greater than the trip setpoint 118, a trip signal 122 results for that channel. As described previously, in at least some embodiments, one or more other trip signals on another channel associated with the same shutdown system would be required before reactor shutdown.

Figure 6:
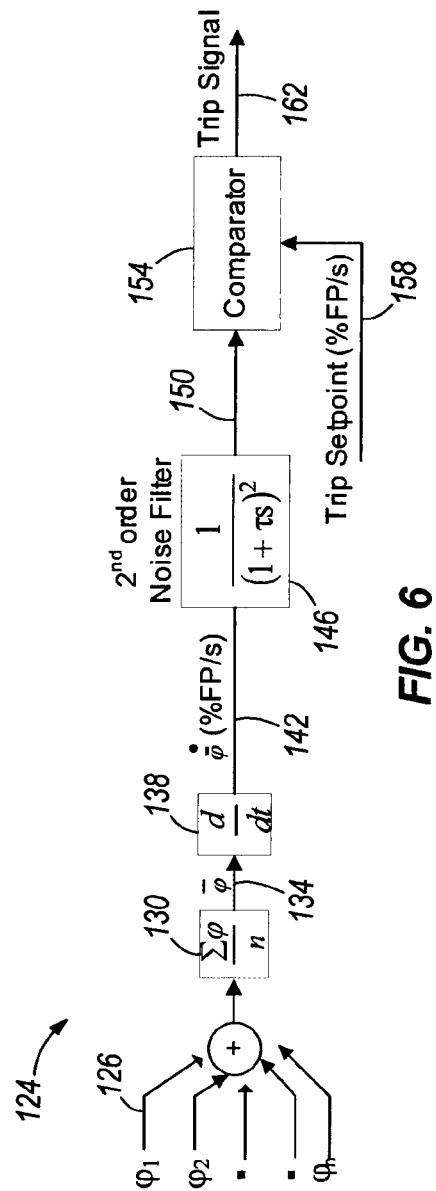
FIG. 6 is a block diagram of an algorithm for an average neutron flux rate-based SDS trip signal.

FIG. 6 is a block diagram for a rate of the ICFDs' average trip algorithm 124. Unlike the trip algorithm 92 described with respect to FIG. 5, the rate of the ICFDs' average trip algorithm 124 receives neutron flux inputs 126 from n ICFD detectors on a single channel. For example, if Channel D has eighteen ICFDs, then the trip algorithm for SDS1 channel D receives inputs from all eighteen ICFDs associated with that channel. The n signals are numerically averaged in an averaging module 130 to produce an average measured flux signal 134. The average measured flux signal 134 then passes through a rate module 138 to produce a rate of the ICFDs' average signal 142. The rate module 138 may be a portion of a micro-processor or may include, for example, a differentiator circuit.

Signal 142 is then passed through a $2^{nd}$ order low pass filter module 146, with time constant τ. Like the circuit of FIG. 5, the time constant τ is determined by analysis. A filtered rate of the ICFDs' average signal 150 then enters a comparator module 154. Within the comparator module 154, the filtered rate of the ICFDs' average signal 150 is compared to a preset trip setpoint 158. If the filtered rate of the ICFDs' average signal 150 is greater than the trip setpoint 158, a trip signal 162 results for that channel.

Basing a trip signal 162 on a rate of the ICFDs' average signal 142 rather than individual signals from each ICFD has several advantages. First, the peak noise value of the average flux signal is much lower than the noisiest detector in a trip channel. Lower noise allows the use of lower trip setpoints, which in turn results in a more effective (faster) trip signal. Unlike prior art trip signals, which utilize the single highest detector reading in a safety channel, this trip logic uses signals from all detectors, thus making it more immune to spurious trips. Furthermore, this trip requires only a single rate circuit 138 and a single meter in the main control room per channel to inform a reactor operator, as opposed to a rate circuit and a meter for each detector.

Figure 7:
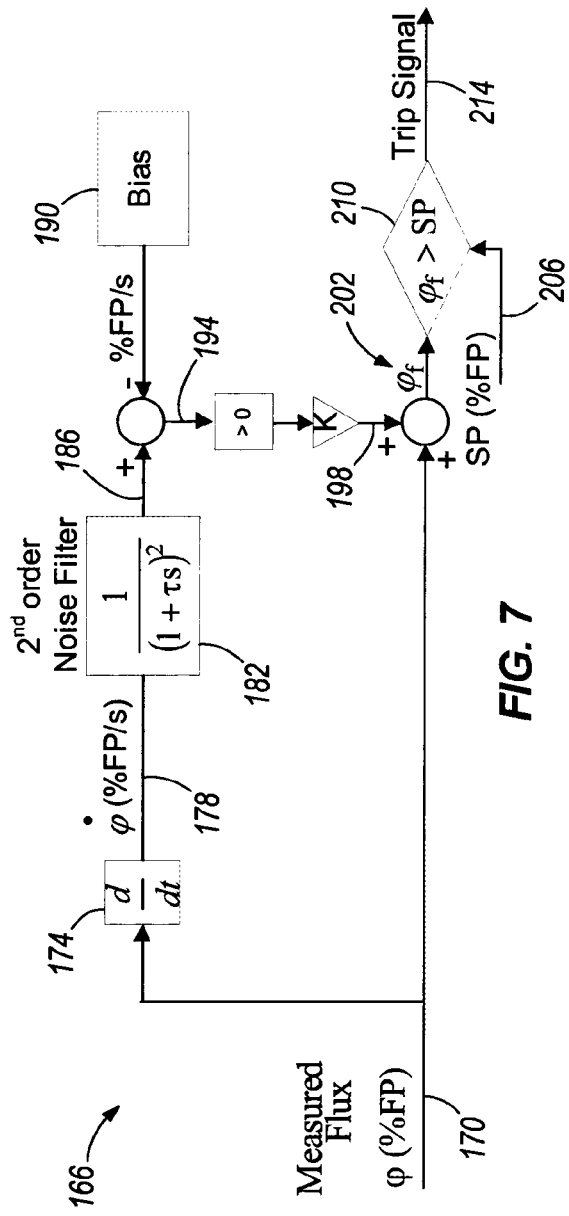
FIG. 7 is a block diagram of an algorithm for a rate-assisted neutron flux-based SDS trip signal.

FIG. 7 is a block diagram of a rate-assisted regional over power (RAROP) trip algorithm 166. The RAROP trip algorithm 166 is based on individual ICFD signal readings plus a component based on the rate of change (i.e., first derivative) of the individual ICFD signals. A measured flux signal 170, expressed as a % FP, enters a rate module 174, in order produce a flux rate signal 178 (% FP/s). The flux rate signal 178 is then filtered in a $2^{nd}$ order noise filter module 182 to produce a filtered flux rate signal 186. A bias 190 is then compared with the filtered flux rate signal 186. If the filtered flux rate signal 186 is greater than the bias 190, then a flux rate difference 194 will be positive (i.e., greater than zero). A gain K, expressed in seconds, is multiplied by the flux rate difference 194 to amplify the rate-assisted component 198 expressed in % FP. The rate-assisted component 198 is added to the original measured flux signal 170 to produce a rate-assisted flux signal 202. The rate-assisted flux signal 202 is compared with a preset trip setpoint 206 in a comparator module 210. If the rate-assisted flux signal 202 is greater than the trip setpoint 206, a trip signal 214 results.

The RAROP trip algorithm takes advantage of the fact that following a LOCA, the ICFDs' rate signals increase faster than the flux increase measured by the detectors. Thus, the RAROP trip algorithm 166 is expected to significantly reduce trip times in major reactor casualties such as a large LOCA. The faster trip time is expected to reduce peak reactivity, maximum fuel centerline temperature, and peak sheath temperature.

Figure 8:
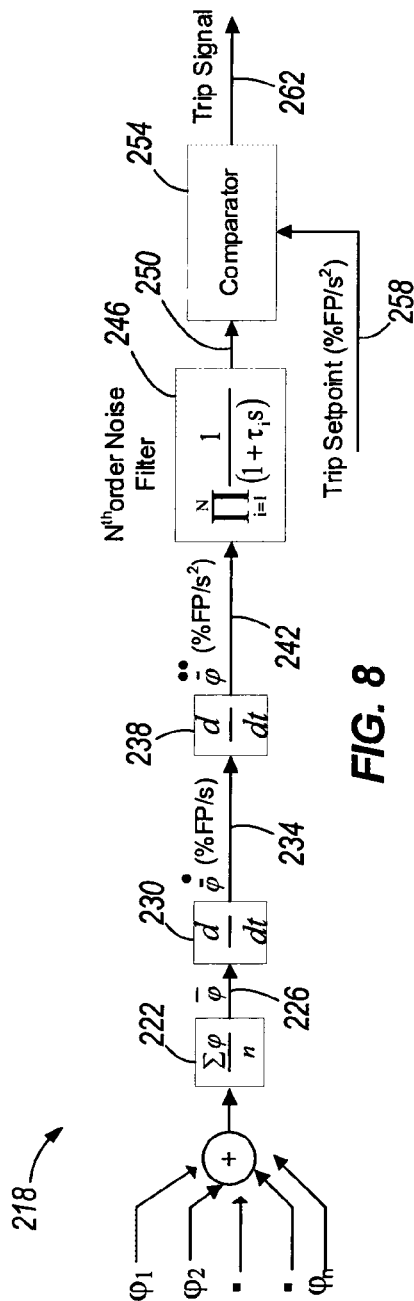
FIG. 8 is a block diagram of an algorithm for an average neutron flux-acceleration based SDS trip signal.

FIG. 8 is a block diagram of an acceleration of the ICFDs' average trip algorithm 218. This trip is based on the acceleration (second derivative) of the average flux measured by ICFDs and takes advantage of the fact that following a LOCA, the second derivative of a flux signal increases much more quickly than the flux signal itself. An averaging module 222 receives signals from n ICFD detectors to produce an average flux signal 226. The average flux signal 226 is then processed by a first rate module 230 to produce an average flux rate signal 234. The average flux rate signal 234 is processed by a second rate module 238 to produce an average flux acceleration signal 242. The first rate module 230 and second rate module 238 may be implemented as a single rate module including, for example, one or more differentiator circuits. The average flux acceleration signal 242 is then filtered by an $N^{th}$ order noise filter module 246. A filtered average flux acceleration signal 250 is then received by a comparator module 254 and compared to a preset trip setpoint 258. If the filtered average flux acceleration signal 50 is greater than the trip setpoint 258, a trip signal 262 results.

A trip based on the acceleration of the ICFDs' average in a shutdown system channel has a number of advantages. Although the average flux acceleration is slower than the fastest flux acceleration, a trip based on the average is actually faster because lower noise values allow the use of a much lower trip setpoint. Furthermore, spurious trip immunity is increased because an average flux acceleration is highly insensitive to noise spikes or other unusual behavior in any single detector.

The trip setpoints 118, 158, 206, 258 described with respect to FIGS. 5-8 may be predetermined values determined by analysis of experimental and operational data. A trip setpoint at any given time may be one of a plurality of predetermined values optimized for different operational conditions. The trip setpoint may be manually or automatically selected for a given operating condition from a plurality of trip setpoints, or may be a variable determined by one or more input parameters including an operational condition. Operating conditions that may factor into the trip setpoint include, for example, reactor coolant pump speeds or operation, reactor coolant pressure or temperature, and the current reactor power.

The trips herein could be implemented either on analog, CPU based computer, or Field Programmable Gate Array (FPGA) platforms.

Thus, the invention provides, among other things, a trip algorithm for reactor shutdown systems. Various features and advantages of the invention are set forth in the following claims.

What is claimed is:

1. A method of controlling a nuclear reactor shutdown system, the method comprising:
    detecting a fission rate within a core of a nuclear reactor with a sensor, the sensor providing an output signal corresponding to the fission rate;
    determining a measured flux signal from the output signal with a signal conditioning module, the measured flux signal corresponding to a percentage of a reactor power;
    calculating a first derivative of the measured flux signal with a rate module, the rate module outputting a rate signal corresponding to a percentage of reactor power per unit of time;
    calculating a flux rate difference signal based on the rate signal and a bias value;
    applying a gain to the flux rate difference signal to produce a rate-based signal component;
    summing the rate-based signal component and the measured flux signal to produce a rate-assisted flux signal corresponding to a percentage of a reactor power;
    comparing the rate-assisted flux signal to a trip setpoint with a comparator module, the comparator module generating a trip signal if the rate-assisted flux signal is greater than the trip setpoint; and
    introducing one selected from a group consisting of a neutron-absorbing solution and neutron-absorbing rods into the core of the reactor in response to the trip signal being generated,
    wherein determining the measured flux signal includes determining a linear measured flux single from the linear output signal with the signal conditioning module, the linear measured flux signal corresponding to a linear percentage of a reactor power.

2. The method of claim 1, wherein the sensor includes an in-core flux detector.

3. The method of claim 1, further comprising filtering the rate signal with a noise filter module prior to biasing the rate signal.

4. The method of claim 3, wherein the act of filtering the rate signal is performed with a second order low pass noise filter.

5. The method of claim 1, wherein the trip signal is a first trip signal associated with a first shutdown system logic channel, and wherein introducing the neutron-absorbing rods into the core of the reactor occurs in response to at least the first trip signal and a second trip signal associated with a second shutdown system logic channel.

6. The method of claim 1, wherein the act of calculating a flux rate difference signal includes comparing the rate signal with a bias value.

7. The method of claim 1, wherein applying the gain to the flux rate difference signal includes applying the gain to the flux rate difference signal when the flux rate difference has a positive value.

8. The method of claim 1, wherein the gain is not applied when the flux rate difference signal has a negative value.

9. A shutdown system for a nuclear reactor having a reactor core, the system comprising:
    a sensor associated with the reactor core and operable to detect a fission rate within the core and generate an output signal related to the fission rate;
    a signal conditioning module operable to generate a measured flux signal based on the output signal, the measured flux signal corresponding to a percentage of a reactor power of the nuclear reactor;
    a shutdown system trip controller including
        a rate module operable to generate a rate signal from the measured flux signal, the rate signal corresponding to a percentage of the reactor power of the nuclear reactor per unit of time;
        a comparator module operable to compare the rate signal with a bias value, the comparator module generating a flux rate difference signal based on the comparison;
        an amplifier module operable to apply a gain to the flux rate difference signal to produce a rate-based signal component, and
        a summing module operable to apply the rate-based signal component to the measured flux signal to produce a rate-assisted flux signal,
        wherein the comparator module is further operable to compare the rate-assisted flux signal to a trip setpoint, the comparator module generating a trip signal if the rate-assisted flux signal is greater than the trip setpoint; and
    a shutdown apparatus operable to absorb neutrons within the reactor core upon receipt of the trip signal,
    wherein the measured flux signal is a linear measured flux signal based on a linear output signal, the linear measured flux signal corresponding to linear percentage of reactor power of the nuclear reactor.

10. The shutdown system of claim 9, wherein the shutdown apparatus includes neutron-absorbing rods.

11. The shutdown system of claim 9, wherein the shutdown apparatus includes a neutron-absorbing solution.

12. The shutdown system of claim 9, wherein the sensor includes an in-core flux detector.

13. The shutdown system of claim 9, wherein the comparator module operable is further configured to determine whether the flux rate difference signal is positive.

14. The shutdown system of claim 9, wherein the rate module is operable to generate the rate signal by calculating a first derivative of the measured flux signal and wherein the shutdown system trip controller further includes a second-order, low pass filter for filtering noise in the rate signal.

15. A controller for producing a nuclear reactor shutdown system trip signal in response to a sensor signal, the controller comprising:
    a signal conditioning module receiving the sensor signal and outputting a measured flux signal;
    a rate module operable to generate a rate signal from the measured flux signal, the rate signal corresponding to a percentage of reactor power of the nuclear reactor per unit of time;
    a comparator module operable to compare the rate signal with a bias value, the comparator module generating a flux rate difference signal;
    an amplifier module operable to apply a gain to the flux rate difference signal to produce a rate-based signal component; and
    a summing module operable to apply the rate-based signal component to the measured flux signal to produce a rate-assisted flux signal;
    wherein the comparator module is further operable to compare the rate-assisted flux signal to a trip setpoint and generate a trip signal, and
    wherein one selected from a group consisting of a neutron-absorbing solution and neutron-absorbing rods is inserted into the core of the reactor in response to the trip signal being generated, wherein the measured flux signal is a linear measured flux signal.

16. The controller of claim 15, wherein the controller includes a micro-processor.

17. The controller of claim 15, wherein the controller includes a second-order, low pass filter operable to filter noise in the rate signal.

* * * * *